United States Patent [19]

Kamijo et al.

[11] Patent Number: 4,806,206

[45] Date of Patent: Feb. 21, 1989

[54] PROCESS FOR PREPARING CERAMIC MOLDING

[75] Inventors: Masayasu Kamijo; Shinichiro Katsuta, both of Fuji; Takeo Wada, Kawanishi, all of Japan

[73] Assignees: Kojin Co., Ltd.; Takeda Chemical Industries Ltd., both of Osaka, Japan

[21] Appl. No.: 859,198

[22] Filed: Apr. 28, 1986

Related U.S. Application Data

[63] Continuation of Ser. No. 634,736, Jul. 25, 1984, abandoned.

[30] Foreign Application Priority Data

Jul. 28, 1983 [JP] Japan ................................ 58-138372

[51] Int. Cl.$^4$ ............................................. D21F 11/00
[52] U.S. Cl. ...................... 162/145; 162/150; 264/60; 264/63; 264/285; 264/345; 501/82; 501/83
[58] Field of Search .................... 264/60, 63, 285, 345; 501/82, 83; 162/145, 150

[56] References Cited

U.S. PATENT DOCUMENTS

| | | | |
|---|---|---|---|
| 3,573,158 | 3/1971 | Pull et al. | 162/145 |
| 3,649,406 | 3/1972 | McNish | 264/60 |
| 3,702,279 | 11/1972 | Ardary | 264/60 |
| 3,932,161 | 1/1976 | McNish | 264/60 |
| 4,248,810 | 2/1981 | Erskine | 264/60 |

FOREIGN PATENT DOCUMENTS

| | | |
|---|---|---|
| 47-45602 | 11/1972 | Japan . |
| 51-43485 | 11/1976 | Japan . |
| 57-58480 | 12/1982 | Japan . |

OTHER PUBLICATIONS

Merck Index, 10th Edition (1983) pp. 254, 273, 274.
Kirk-Othmer, Encyclopedia of Chemical Technology, 2nd Edition, vol. 4, pp. 593–595, 598–599 and 643–645.
The Dictionary of Paper, 3rd Edition, 1965, New York, pp. 64–65 & 472–473.
Casey, James P., Pulp and Paper Chemistry & Chem. Tech., 3rd Ed., vol. III, 1981, pp. 1475, 1508–1509.
MacKenzie, R. C., Differential Thermal Analysis, vol., 1970, pp. 557–573.
English Translation of Japanese Patent Publication Sho 57-58480.

Primary Examiner—James Derrington
Attorney, Agent, or Firm—Parkhurst, Oliff & Berridge

[57] ABSTRACT

A process for preparing ceramic moldings containing no organic matter with retention of their original shapes which comprises mixing 100 parts by weight of ceramic powders and/or fibers, 0.1 to 50 parts by weight of papermaking organic fibers and/or wet-end additives and 3 to 200 parts by weight of mountain leather, molding the resulting mixture to obtain an unburned molding having enough mechanical strength to withstand molding processings and, subjecting the unburned molding to burning treatment.

7 Claims, No Drawings

PROCESS FOR PREPARING CERAMIC MOLDING

This is a continuation of application Ser. No. 634,376 filed July 25, 1984, now abandoned.

BACKGROUND OF THE INVENTION

1. Field of the Invention

The present invention relates to an improved process for preparing ceramic moldings using mountain leather as a part of raw materials.

Ceramic moldings using mountain leather have been heretofore described in publications.

In Japanese Patent Publication No. 45602/1972, a process for preparing flame-resistant paper comprising mountain leather or mountain wood, short fibers of which being closely contacted with each other, which process comprises adding water to beaten mountain leather or mountain wood to give a paste-like product, filtering the resulting paste-like product to remove foreign matters therefrom and then subjecting to paper-making is described.

In Japanese Patent Publication No. 43485/1976, heat-resistant sheets prepared by dispersing ceramic fibers in water using sepiolite as a binder and sucking the dispersion in vacuum, etc. and the use of colloidal silica or colloidal alumina as the binder in combination with sepiolite are disclosed.

In Japanese Patent Publication No. 58480/1982, there is disclosed flame-resistant sheets which are obtained by dispersing inorganic fibers or synthetic fibers (fibers comprising organic, synthetic polymers) in an aqueous dispersion of mountain leather and making the dispersion paper-like form.

These prior arts have their limitation on formulation since it is primarily aimed at imparting flame resistance and heat resistance to the sheet-like products per se.

Mountain leather is an inorganic substance which has peculiar properties that it may per se form sheets having mechanical strength to a certain extent. However, the mechanical strength is still insufficient and particularly in complicated secondary processing such as corrugating, the mechanical strength is unsatisfactory. To compensate for the insufficient mechanical strength, it is generally known to use cellulose pulp or organic polymers, etc. in combination. However, these materials have contradictory tendencies that if the content of organic substance increases, the strength increases but the characteristic properties of inorganic substance such as heat resistance, etc. are lowered; if the content of the organic substance decreases, the properties of inorganic substance such as heat resistance, etc. are enhanced but the mechanical strength decreases. Accordingly, the prior art materials involve a drawback that utility is greatly limited as they are.

Aqueous dispersion of mountain leather is of poor drainage rate as compared to ordinary wood pulp or stuffs. As a result, although it has been possible to manually make short sheet products containing mountain leather as a binder, paper-making of continuous sheet products using paper-making machine was impossible.

As a result of extensive investigations in an attempt to eliminate the foregoing drawbacks in the present circumstances, the present inventors found out that properties required in unburned state and properties required after burning may be separately imparted to the product. The present invention has been accomplished based on such finding.

SUMMARY OF THE INVENTION

An object of the present invention is to provide a process for preparing inorganic materials which possess, in unburned state thereof, strength enough to withstand molding processing.

Another object of the present invention is to provide a process for preparing ceramic moldings having no distortion by molding materials that have been produced in accordance with the above-mentioned process, followed by burning.

The present invention relates to a process for preparing ceramic moldings which comprises mixing powders or fibers of ceramic material, paper-making organic fibers and/or wet-end additives, and mountain leather and, directly molding or forming the desired moldings, or, further forming the once molded products into another shape, followed by burning.

That is to say, the mechanical stength of the material in unburned state is provided with organic polymer component, whereby the molding and processing are facilitated, and after molding, superior features inherent in inorganic substance such as flame resistance, heat resistance, insulating property etc. are exhibited in combination with the features of mountain leather such as film-forming property, sintering property, etc. by removal of organic substance in burning.

DETAILED DESCRIPTION OF THE INVENTION

The present invention relates to a process for preparing ceramic moldings comprising the following steps:

(1) Step of mixing 100 parts by weight of ceramic powders and/or ceramic fibers, 0.1 to 30 parts by weight of papermaking organic fibers and/or wet-end additives and; 3 to 200 parts by weight of mountain leather;

(2) Step of preparing moldings from the resulting mixture; and (3) Step of burning the moldings.

Typical examples of powders or fibers of ceramic materials which can be used in the present invention include natural inorganic substance such as silica stone, silica sand, diatomaceous earth, kibushi clay, Kaerome clay or Gaerome clay, kaolin, kaolinite, halloysite, montmorillonite, bauxite, bentonite, zeolite, apatite, diaspore, gibbsite, mica-clay (sericite, illite), vermiculite, mica, acid earth, Japanese pottery's stone (mainly composed of quartz and serisite or kaoline), agalmatolite, feldspar, limestone, wollastonite, gypsum, dolomite, magnesite, talc, etc.; metal hydroxides such as aluminum hydroxide, magnesium hydroxide, iron hydroxide, etc.; hydrates of various oxides such as calcium silicate hydrates, e.g., tobermorite and xonotlite, calcium aluminate hydrates, calcium aluminum sulfate hydrates, etc.; alumina, silica, magnesia, calcia, zirconia, thoria, beryllia, titanium oxide, spinel, synthetic cordierite, synthetic mullite, synthetic zeolite, chromite, chrom magnesites, magnesia chromites, synthetic calcium carbonate, calcium phosphate, and other various carbides (TiC, ZrC, HfC, VC, TaC, NbC, WC, $B_4C$, SiC, etc.), nitrides (TiN, VN, NbN, TaN, HfN, AbN, BN, $Si_3N_4$, etc.), iron oxide, lead oxide, zinc oxide, nickel oxide, manganese dioxide, copper oxide, cobalt oxide, barium carbonate, manganese carbonate, titanates (potassium titanate, ($K_2O_nTiO_2$; n=1 to 8), calcium titanate, magnesium titanate, strontium titanate, barium titanate, etc.), graphite, activated carbon; metal powders of molybdenum, tungsten, etc.; synthetic inorganic powders such as various inorganic pigments, etc. glass fibers, rock wool, asbestos, slag wool, kaolin fibers, boron fibers, carbon fibers, ceramic fibers, quartz fibers, fused silica fibers, high alumina fibers, etc.

Further examples of ceramic fibers include aluminosilicate fibers having a ratio of $Al_2O_3: SiO_2$ being about 50:50 to 60:40, synthetic mullite fibers having a ratio of $Al_2O_3:SiO_2$ being about 70:30 to 80:20, etc. The high alumina fibers refer to those having a ratio of $Al_2O_3$:-$SiO_2$ being about 70:30 to 95:5. One or more of these ceramic materials are appropriately chosen depending upon properties required after burning.

Next, examples of papermaking organic fibers which can be employed in the present invention include pulp obtained from soft woods such as larch, spruce, etc.; pulp obtained from hard woods such as oak, beech, etc.; long fibers suited for Japanese paper preparation such as mitsumata (paper birch; *Edgeworthia chrysantha, Lindl.* or *Edgeworthia papirifera, Sieb. et Zucc.*), paper mulberry (*Broussonetia kajinoki, Sieb.* or *Broussonetia papyrifera, L. Herit.*), Gampi (*Wistroemia sikokina, Frauch. et S.*), etc; natural fibers such as hemp (manila hemp or sisal hemp), cotton, etc.; or powders thereof; cationic pulp obtained by cationic modification of these cellulose pulps; fibers of polyvinyl alcohol, polyamide, polyacrylonitrile, polyester, polyethylene, polypropylene, polyvinyl chloride, matrix fibers (polyvinyl chloride in polyvinyl alcohol), rayon, etc. As the wet-end additives, there can be mentioned spinnable high molecular weight substances and wet-strength resins. Examples of the spinnable polymer coagulants include anionic polymers (e.g., sodium polyacrylate, partially hydrolyzed salts of polyacrylamide, etc., salts of maleic acid copolymers), cationic polymers (e.g., partial hydrolyzate of polyacrylamides, acrylamide copolymers), nonionic polymers (e.g., polyacrylamide, polyvinyl alcohol, polyethylene oxide), natural spinnable high molecular weight substances such as viscous liquids of albumen, TOROROAOI (*Hibiscus manihot, L.*), NORINOKI (*Hydrangea paniculate*), Okura-nut (*Hibiscus esculentus, L.*), etc. It is sufficient that these materials be as viscous as spinnable when dissolved in water. Examples of the wet-strength resins which can be used include water soluble urea resins, melamine resins, cathionic starch, CMC, polyamide-polyamine epichlorohydrin resins, polyimine resins, water soluble acrylic resins, etc. Further, sizing agents made from rosin, petroleum resin, or copolymer of maleic anhydride, including neutral sizing agent, synthetic resin emulsions, rubber latexes, etc. may also be incorporated. One or more of these organic polymers are appropriately chosen depending upon properties required prior to burning but removed by subsequent burning. It is appropriate that the total quantity of these organic binder components to be used be from 0.1 to 50 parts by weight, preferably 0.1 to 30 parts by weight, and more preferably 0.3 to 30 parts by weight, per 100 parts by weight of the foregoing ceramic materials. In addition, further additives that react with the ceramic materials or per se change to ceramic materials even though they remain after burning, may also be used and such examples include fluorine-containing oil resistant agents, release agents, silicone type water-repellents, silane coupling agents, alum, sodium aluminate, sodium phosphate, polyphosphoric acid, ammonium polyphosphate, alumina sol, silica sol, etc.

The mountain leather used in the present invention collectively refers to a group of clay minerals having numerous active hydroxyl groups at the surfaces thereof and includes, in addition to generally termed mountain leather, those called mountain cork, mountain wood, in which are included sepiolite which is one of hydrous magnesium silicates and attapulgite (or palygorskite) which is one of hydrous magnesium aluminum silicates. Meerschaum used for pipe and magnesium trisilicate used as an antacid are a sort of mountain leather.

The mountain leather is used in the present invention after removing therefrom grains of other rocks found in crude mountain leather. A preferred process for purifying the mountain leather comprises reacting hydrogen peroxide or polyvalent alcohols onto crude mountain leather to swell mountain leather, dispersing the swollen mountain leather in hot water, separating the mountain leather from foreign matters precipitated by decantation and then drying. The thus purified mountain leather does not contain any foreign matter which impedes molding and is easily redispersible in water. The thus obtained mountain leather is excellent in binding ability as a binder for other components to be formulated.

The mountain leather used in the present invention may be powdery, a dispersion dispersed in water (hot water) or a paste. The amount of the mountain leather to be used is in the range where the composition of the present invention is imparted plasticizability thereby or an aqueous dispersion capable of paper making can be formed and the shape of ceramic molding can be maintained even after burning. To express the above in figures, the amount of mountain leather is 3 to 200 parts by weight, preferably 10 to 100 parts by weight, based on 100 parts by weight of the ceramic materials.

The ceramic moldings in accordance with the present invention may be obtained by mixing the mountain leather and other components described above and applying various molding methods to the resulting mixture.

Any mixing means may be used. Since the mountain leather can be present in any one of the forms of powders, paste and dispersion, powders, fibers, paste or dispersion of other components may be added to the mountain leather in one of the above-mentioned forms using appropriate means. In case that the resulting mixture is powdery, about 40-80% of water or hot water is added thereto and the mixture is sufficiently kneaded so that the mixture becomes plastic; thus the mixture can be molded using optional molding means such as molding, extrusion, etc. In dispersing the mountain leather, the use of hot water is preferable to cold water because the dispersibility of the mountain leather and its mixing capability with other materials are excellent as compared to the case of using cold water.

Further, muddy, plasticized products having water content of 80% or less can be obtained by first making an aqueous dispersion of mountain leather, adding other components thereto to obtain a co-dispersion, adding a spinnable polymer coagulant to the co-dispersion to coagulate and precipitate the dispersant and collecting only the precipitates. The plasticized muddy products may be molded using optional molding means. Further in case that paper-like compositions are wished to obtain, the paper-like compositions can be obtained by preparing a dispersion of mountain leather, adding other components thereto to co-disperse, subjecting the resulting co-dispersion to paper-making. The compositions may be molded using optional molding means.

As methods for molding ceramic moldings, there can be mentioned molding method, extruding method, shaping roll method, doctor blade method, paper making method, vacuum suction method, etc. In case that the products molded by these methods are in a sheet form, the sheet products may further be subjected to a forming into complicated shapes by folding, bending, cutting, sticking, etc., in addition to processing such as printing, coating, laminating, etc. In case that such formings are performed, the performance becomes extremely easy when the sheet products possess properties such as in paper made of ordinary cellulose pulp and accordingly, the properties resulting from the organic materials become effective.

In particular, cellulose long fibers such as soft wood pulp, hemp pulp, cotton, long fibers suited for Japanese paper preparation, or synthetic fibers utilized as constituting fibers or binder fibers for nonwovens are very effective even in a small quantity in obtaining the sheet products described above. The thus obtained unburned ceramic moldings possess, to a certain extent, flame resistance and heat resistance depending upon the formulation thereof. However, in order to secure the properties as ceramic moldings, the organic materials are rather harmful in many cases. Accordingly, the utility of the ceramic moldings retaining such organic materials therein is extremely limited. To resolve the above, there are a method which comprises burning out the organic materials rather unnecessary after molding to leave inorganic substance alone and thereby improve the desired properties and a method which comprises sintering to convert into quite different ceramics to cause to have different properties. The term "burning" used herein is intended to mean either one or both of such burning out treatment and sintering treatment.

As for the burning condition, for example, heating at 250° to 1200° C. for 1 to 120 minutes is sufficient in the case of burning out; in the case of sintering, heating is performed at 550° to 1600° C. for 1 to 10 hours. The thus obtained ceramic moldings in accordance with the present invention are applicable to a wide range of utilities such as elements for heat exchangers, carriers for catalysts, porous ceramics, china and porcelain for decoration and technical arts, elements for far-infrared radiation, heat insulating materials, lagging materials, heat resistant materials for electronic industries, electrically insulating materials (e.g. IC chips, base plates for printing circuits, etc.), heat resistant filters, heat resistant packing materials, etc. and are extremely useful.

The invention will now be described with reference to several examples thereof. These examples are, however, not intended to limit the scope of this invention, but various modifications will be possible without departing from the scope of this invention which is defined by the appended claims.

EXAMPLES 1 TO 3 AND COMPARATIVE EXAMPLES 1 TO 3

In an aqueous dispersion of mountain leather, were added ceramic fibers (Kaowool Bulk S manufactured by Isolite Bubcock Refractories Co., Ltd.) having a compositional ratio of 47% of $Al_2O_3$ and 52% of $SiO_2$ and hemp pulp in the proportion shown in Table 1. The composition was subjected to wet paper making to prepare sheet-like products having a thickness of 0.15 mm. The resulting sheets were further subjected to corrugating with a corrugater to effect molding. The moldings were then put in an electric furnace, wherein burning (burning out) was performed at 600° C. for 1 hour in an oxidizing atmosphere, followed by examination of the moldings. Thereafter, sintering was further performed at 1300° C. for 2 hours.

TABLE 1

| Sample No. | Ceramic Fiber (part by wt.) | Hemp Pulp (part by wt.) | Mountain Leather (part by wt.) | Corrugation Processability in Unburned State | Shape Retaining Property after Burning at 600° C. | Shape Retaining Property after Sintering at 1300° C. |
|---|---|---|---|---|---|---|
| Example 1 | 100 | 10 | 30 | ⊚ very good processability | ⊚ | ⊚ |
| Example 2 | 100 | 30 | 10 | ⊚ very good processability | ⊚ | ⊚ |
| Example 3 | 100 | 2 | 100 | ○ very good processability | ⊚ | ○ |
| Comparative Example 1 | 100 | 0 | 2 | X poor processability | △ | X |
| Comparative Example 2 | 100 | 60 | 0 | ○ good processability | X | X |
| Comparative Example 3 | 100 | 0 | 210 | X poor processability | ⊚ | ⊚ |

⊚: Original shape was retained without any deficiency.
○: Original shape was retained without substantial deficiency.
△: Original shape was partly damaged.
X: No original shape was retained.

As is apparent from Table 1, the moldings prepared in Examples 1 to 3 were good in corrugation processability and retained original shapes after burning as well as after sintering. On the contrary, the moldings prepared in Comparative Examples 1 to 3 were poor in either one of corrugation processability and shape retaining properties after burning and sintering.

EXAMPLE 4

In 30 parts by weight of an aqueous dispersion of mountain leather, were added 50 parts by weight of ceramic fibers (Fineflex 1300 bulk manufactured by Nichias Corporation) having a compositional ratio of $Al_2O_3:SiO_2$ being about 50:50, 20 parts by weight of Georgia kaoline and 3 parts by weight of polyvinyl alcohol fibers (Kuraray VPB, 105×3 mm, manufactured by Kuraray Kabushiki Kaisha). 0.1 part by weight of a 0.2% polyethylene oxide aqueous solution was then added thereto. Thereafter, the mixture was subjected to wet paper making using a wet paper making machine to prepare a sheet having a thickness of 0.3 mm.

The sheet could easily be folded even into complicated shapes. Further, the sheet could be cut and sticked so that complicated relief patterns could be made thereon. Silica sol (Snowtex C, $SiO_2$ content of 20%, manufactured by Nissan Kagaku Kogyo Kabushiki Kaisha) was thinly coated on the patterns with a brush. After drying, burning was performed at 700° C. for 1 hour so that the organic substance was completely removed and a semi-ceramic molding was formed. A glaze was further coated on the molding and sintering was performed at 1300° C. for 2 hours to give a beautiful relief having high strength.

EXAMPLE 5

To the aqueous dispersion of ceramic fibers, hemp pulp and mountain leather having the same formulation as in Example 1, 3.0 parts by weight of an aqueous solution of polyamide-polyamine-epichlorohydrin resin were added. Then, the mixture was subjected to paper making using a wet paper making machine to obtain a sheet having a thickness of 0.2 mm.

After the sheet was mechanically folded into a concave and convex shape having a depth of 5 mm, the sheet was cut into a size as large as the fish broiling net of a fish broiler with a cover, put under the fish broiling net and put on a gas heater. The fish broiler was burned for 1 minute without charging anything therein, whereby the organic matter of the sheet was burned out. Then, fish was put on the net of the broiler and the cover was shut down followed by broiling. Due to far-infrared radiation, fish was broiled even to the core with appropriate scorching. Further, the oil flown out from the fish was absorbed by the sheet so that generation of smoke was merely about ¼ that in the case of not using this sheet. Incidentally, the sheet of this example, after having been burned, was heated at 500° C., and the infrared radiation characteristics were measured. The radiation rate of far-infrared rays was 90% or more in the long wavelength region of 5 $\mu$m or more.

EXAMPLE 6

In 40 parts by weight of an aqueous solution of mountain leature, 80 parts by weight of Molecular Sieves (manufactured by Union Showa Co., Ltd.), 20 parts by weight of activated carbon fibers and 10 parts by weight of hemp pulp were dispersed and the dispersion was subjected to wet paper making to prepare a sheet having a thickness of 0.15 mm. The sheet was made into a honeycomb molding via a concave and convex paper shape. In the preparation of the honeycomb molding, an alumina sol inorganic adhesive was used. By burning the molding at 400° C., the organic substance was removed and Molecular Sieves 4A and activated carbon fibers were activated. The molding could be used as deodorant materials. Further, even though the molding was re-heated to 250° C. or more for reuse thereof, it did not show any changes in shape. Thus, the molding could be repeatedly used as deodorant materials.

EXAMPLE 7

To an aqueous dispersion of mountain leather (solid content: 100 parts by weight), were added and well dispersed 50 parts by weight of amorphous mineral fibers (manufactured by Nihon Cement Kabushiki Kaisha; trademark: ASANO CMF; average fiber diameter 5 $\mu$m and average fiber length 7 mm) which was a sort of rock wool having a compositional ratio of 10 to 20% of $Al_2O_3$, 35 to 45% of $SiO_2$, 30 to 40% of CaO and 4 to 7% of MgO, 50 parts by weight of fibrous potassium titanates (manufactured by Otsuka Chemical Co., Ltd.; trademark: TISMO D) and 3 parts by weight of hemp pulp. Thereafter, 4 parts by weight of copolymer of malaic anhydride as neutral sizing agent (manufactured by Arakawa Chemical Industry Co., Ltd.; trademark: POLYMALON 360) was added to the dispersion. After pH was adjusted to 4.5 with alum, the dispersion was formed into a sheet having a thickness of 0.4 mm by using a paper making machine. In drying the sheet product, wet pressing was performed while pushing it against a stainless mirror plate, thereby finishing into the product having a Beck's smoothness of 30 to 50 seconds. Then, an electrical circuit was printed on the surface of the sheet product using an inorganic conductive paint and sandwiched between nonprinted products. In sandwiching, mountain leather was kneaded with water to render it paste-like and used to laminate the above to each other. The thus obtained product was burned at 600° C. for 1 hour and further sintered at 1200° C. for 10 hours to prepare a ceramic plate. Electrodes were connected at both terminals of the printed circuit of the sintered ceramic plate and an electric current was applied thereto so that it was possible to use the ceramic plate as a ceramic heater.

EXAMPLE 8

To an aqueous dispersion of mountain leather (solid content: 30 parts by weight), were added and well dispersed 50 parts by weight of mullite fibers (manufactured by Mitsubishi Kasei Kogyo Kabushiki Kaisha, $Al_2O_3:SiO_2=80:20$), 50 parts by weight of silicon carbide whisker (manufactured by Tokai Carbon Kabushiki Kaisha; trademark: TOKAMAX) and 3 parts by weight of soft wood kraft pulp obtained by beating to 25°SR Shopper-Rigler wetness. Then, 2 parts by weight of melamine resin as a paper reinforcing agent were added to the dispersion to prepare a slurry. Subsequently, the slurry was flown into a mold made of a 80 mesh wire net. After dehydrating by a vacuum suction method, the system was heated and dried at 120° C. to form a molding. The molding had a sufficient strength and was easy to handle. Then, the molding was burned at 600° C. for 60 minutes to completely remove the organic substance. Even in this state, the shape retaining property of the molding was good. Thereafter, molten aluminum (melting temperature at about 660° C.) was compresed into the molding to form a fiber-reinforced aluminum composite. The composite having rigidity and strength, in addition to the properties of aluminum is useful as industrial materials.

EXAMPLE 9

To an aqueous dispersion of mountain leather (solid content: 20 parts by weight), were added and well dispersed 100 parts by weight of high alumina fibers (manufactured by Imperial Chemical Industries: trademark: SAFFIL: $Al_2O_3:SiO_2=$about 95:5), 2 parts by weight of hemp pulp and 2 parts by weight of polyamide-polyamine-epichlorohydrin resin. Then, the dispersion was subjected to wet paper making to form a sheet having a thickness of 0.5 mm. The sheet was molded into an optional shape to prepare a preform. Thereafter, the preform was inserted into a mold and burned at 600° C.

for 30 minutes to remove the organic substance. Then, molten aluminum alloy was introduced into the mold and compressed into layers of the preform to thereby obtain a fiber-reinforced aluminum alloy composite similar to that obtained in Example 8.

What is claimed is:

1. A process for preparing a ceramic molding comprising the steps of:
   (1) dispersing in water a composition comprising 100 parts by weight of a ceramic component, 2 to 50 parts by weight of cellulose pulp and 3 to 200 parts by weight of mountain leather, said ceramic component comprising 100 to 20 parts by weight of ceramic fiber and 0 to 80 parts by weight of ceramic powder;
   (2) forming a paper-like sheet from the resulting dispersion using a paper making machine;
   (3) forming a ceramic molding by folding said paper-like sheet; and
   (4) burning said ceramic molding at a temperature between 250° to 700° C. to burn-off said cellulose pulp, resulting in a ceramic molding which retains a pre-burned shape.

2. The process of claim 1, wherein the amount of said mountain leather is 10 to 100 parts by weight.

3. The process of claim 1, wherein the amount of said cellulose pulp is 2 to 30 parts by weight.

4. The process of claim 1, wherein said composition further comprises wet-end additives added in an amount such that the total of said cellulose pulp plus said wet-end additives is not more than 50 parts by weight.

5. The process of claim 4, wherein the amount of cellulose pulp plus wet-end additives is not more than 30 parts by weight.

6. The process of claim 1, wherein after said burning at a temperature of 250° to 700° C., said molding is sintered at a temperature of 550° to 1600° C., said sintering occurring at a temperature which is higher than the burning temperature.

7. A ceramic, formed molding which retains a pre-burned shape, produced according to the process comprising the steps of:
   (1) dispersing in water a composition comprising 100 parts by weight of a ceramic component, 2 to 50 parts by weight of cellulose pulp and 3 to 200 parts by weight of mountain leather, said ceramic component containing 100 to 20 parts by weight of ceramic fiber and 0 to 80 parts by weight of ceramic powder;
   (2) making a paper-like sheet from the resulting dispersion by a paper making machine;
   (3) forming a ceramic molding by folding said sheet; and
   (4) burning said molding at a temperature of 250° to 700° C. to burn-off said cellulose pulp and form said ceramic formed molding.

* * * * *